US011913372B2

(12) United States Patent
Hoshi et al.

(10) Patent No.: US 11,913,372 B2
(45) Date of Patent: Feb. 27, 2024

(54) TURBOCHARGER

(71) Applicant: MITSUBISHI HEAVY INDUSTRIES ENGINE & TURBOCHARGER, LTD., Sagamihara (JP)

(72) Inventors: Toru Hoshi, Tokyo (JP); Yukihide Nagayo, Tokyo (JP); Shoeji Nakaye, Tokyo (JP); Toshikazu Mori, Sagamihara (JP); Takaaki Hagiwara, Sagamihara (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 18/018,180

(22) PCT Filed: Nov. 25, 2020

(86) PCT No.: PCT/JP2020/043800
§ 371 (c)(1),
(2) Date: Jan. 26, 2023

(87) PCT Pub. No.: WO2022/113199
PCT Pub. Date: Jun. 2, 2022

(65) Prior Publication Data
US 2023/0265783 A1    Aug. 24, 2023

(51) Int. Cl.
*F02B 37/02*    (2006.01)
*F02B 33/40*    (2006.01)
(52) U.S. Cl.
CPC ............ *F02B 37/025* (2013.01); *F02B 33/40* (2013.01); *F05D 2220/40* (2013.01); *F05D 2260/961* (2013.01)

(58) Field of Classification Search
CPC ........ F02B 37/025; F02B 33/40; F02B 39/00; F05D 2220/40; F05D 2260/961; Y02T 10/12
See application file for complete search history.

(56) References Cited

U.S. PATENT DOCUMENTS

2012/0099996 A1*  4/2012  Delvaux ............... F04D 29/544
                                                 416/204 A
2012/0288373 A1   11/2012  Duong et al.
(Continued)

FOREIGN PATENT DOCUMENTS

JP       3181200 B2     7/2001
JP       2009-13873 A   1/2009
(Continued)

OTHER PUBLICATIONS

International Search Report for International Application No. PCT/JP2020/043800, dated Jan. 12, 2021, with English translation.
(Continued)

*Primary Examiner* — Brandon D Lee
(74) *Attorney, Agent, or Firm* — BIRCH, STEWART, KOLASCH & BIRCH, LLP

(57) ABSTRACT

This turbocharger includes: an impeller which includes a hub provided to be rotatable around a center axis and a plurality of turbine blades arranged on the outside of the hub in a radial direction at intervals in a circumferential direction around the center axis; and a turbine housing which is disposed on the outside of the impeller in the radial direction and forms a scroll flow path guiding an exhaust gas toward the impeller on the inside of the radial direction while turning the exhaust gas in the circumferential direction, wherein a flow path width in the circumferential direction of at least one of a plurality of inter-blade flow path portions formed between the plurality of turbine blades is different
(Continued)

from a flow path width of the another of the plurality of inter-blade flow path portions.

4 Claims, 12 Drawing Sheets

(56) References Cited

U.S. PATENT DOCUMENTS

| 2014/0286758 | A1 | 9/2014 | Senn |
| 2020/0024988 | A1 | 1/2020 | Comeau et al. |
| 2020/0123907 | A1 | 4/2020 | Colley et al. |

FOREIGN PATENT DOCUMENTS

| JP | 2012-87790 | A | 5/2012 |
| JP | 2013-15035 | A | 1/2013 |
| JP | 5850968 | B2 | 2/2016 |
| JP | 2020-511614 | A | 4/2020 |

OTHER PUBLICATIONS

Written Opinion of the International Searching Authority for International Application No. PCT/JP2020/043800, dated Jan. 12, 2021, with English translation.

\* cited by examiner

TURBOCHARGER

TECHNICAL FIELD

The present disclosure relates to a turbocharger.

BACKGROUND ART

A rotating machine such as a turbocharger has been constantly improved in various ways in order to improve efficiency, suppress vibration, reduce noise, and the like.

For example, Patent Document 1 discloses a configuration that avoids resonance with a turbine blade by allowing a throat width of a part of a turbine vane in a circumferential direction to be different from the other normal throat width.

CITATION LIST

[Patent Document]
[Patent Document 1]
Japanese Patent No. 3181200

SUMMARY OF INVENTION

Technical Problem

Incidentally, in the turbocharger, a scroll portion is provided to guide an exhaust gas, discharged from an engine, to a turbine blade of an impeller on the inside of a radial direction while turning the exhaust gas in a circumferential direction on the outside of the impeller in the radial direction. In order to improve the efficiency of the turbocharger, it is preferable to minimize a gap between a tongue portion of the scroll portion disposed on the outside of the impeller in the radial direction and the turbine blade constituting the impeller. However, if the gap between the tongue portion and the turbine blade is made small, noise may occur due to pressure fluctuations when the turbine blade passes through a low flow speed area of the exhaust gas occurring on the downstream side of the tongue portion.

The present disclosure has been made to solve the above-described problems and provides a turbocharger capable of suppressing noise.

Solution to Problem

In order to solve the above-described problems, a turbocharger according to the present disclosure includes: an impeller which includes a hub provided to be rotatable around a center axis and a plurality of turbine blades arranged on the outside of the hub in a radial direction at intervals in a circumferential direction around the center axis; and a turbine housing which is disposed on the outside of the impeller in the radial direction and forms a scroll flow path guiding an exhaust gas toward the impeller on the inside of the radial direction while turning the exhaust gas in the circumferential direction, wherein a flow path width in the circumferential direction of at least one of a plurality of inter-blade flow path portions formed between the plurality of turbine blades is different from a flow path width of another of the plurality of inter-blade flow path portions.

Advantageous Effects of Invention

According to the turbocharger of the present disclosure, it is possible to suppress noise.

DESCRIPTION OF EMBODIMENTS

First Embodiment

Hereinafter, a turbocharger of the present disclosure will be described with reference to the drawings.

Figure 1:
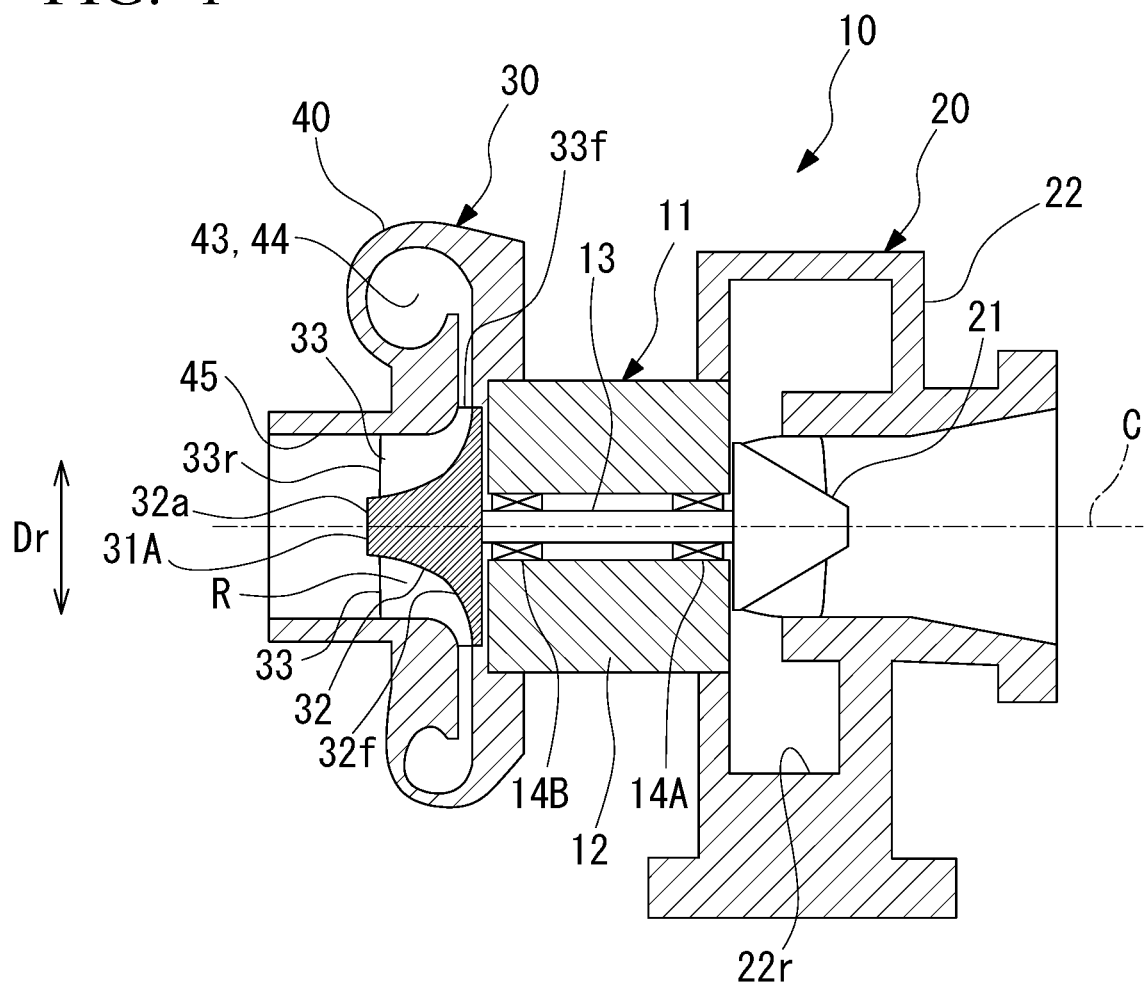
FIG. 1 is a view showing a schematic configuration of a turbocharger of an embodiment of the present disclosure.

(Configuration of turbocharger) As shown in FIG. 1, a turbocharger 10 includes a turbocharger body 11, a compressor 20, and a turbine 30. This turbocharger 10 is mounted on, for example, an automobile or the like as an engine accessory.

The turbocharger body 11 includes a bearing housing 12 and a rotating shaft 13.

The bearing housing 12 is supported by a vehicle body or the like through a bracket (not shown), the compressor 20, the turbine 30, and the like. The rotating shaft 13 is accommodated inside a bearing housing 12. The rotating shaft 13 is supported to be rotatable around a center axis C inside the bearing housing 12 through bearings 14A and 14B. Both ends of the rotating shaft 13 in the direction of the center axis C protrude toward the outside of the bearing housing 12.

The compressor 20 is disposed at one end side of the bearing housing 12 in the direction of the center axis C. The compressor 20 includes a compressor wheel 21 and a compressor housing 22. The compressor wheel 21 is connected to the end portion of the rotating shaft 13 outside the bearing housing 12. The compressor wheel 21 rotates around the center axis C integrally with the rotating shaft 13. The compressor housing 22 is connected to one end side of the bearing housing 12 in the direction of the center axis C. The compressor housing 22 accommodates the compressor wheel 21 therein. A flow path 22r of air introduced from the outside is formed inside the compressor housing 22. The flow path 22r guides the air introduced from the outside to the compressor wheel 21 and sends the air having passed through the compressor wheel 21 to an engine (not shown).

(Configuration of Turbine)

The turbine 30 is disposed at the other end side of the bearing housing 12. The turbine 30 includes a turbine housing 40 and an impeller 31A.

The turbine housing 40 is connected to the other end side of the bearing housing 12. The turbine housing 40 is disposed on the outside of the impeller 31A in the radial direction Dr centered on the center axis C. The turbine housing 40 accommodates the impeller 31A therein.

Figure 2:
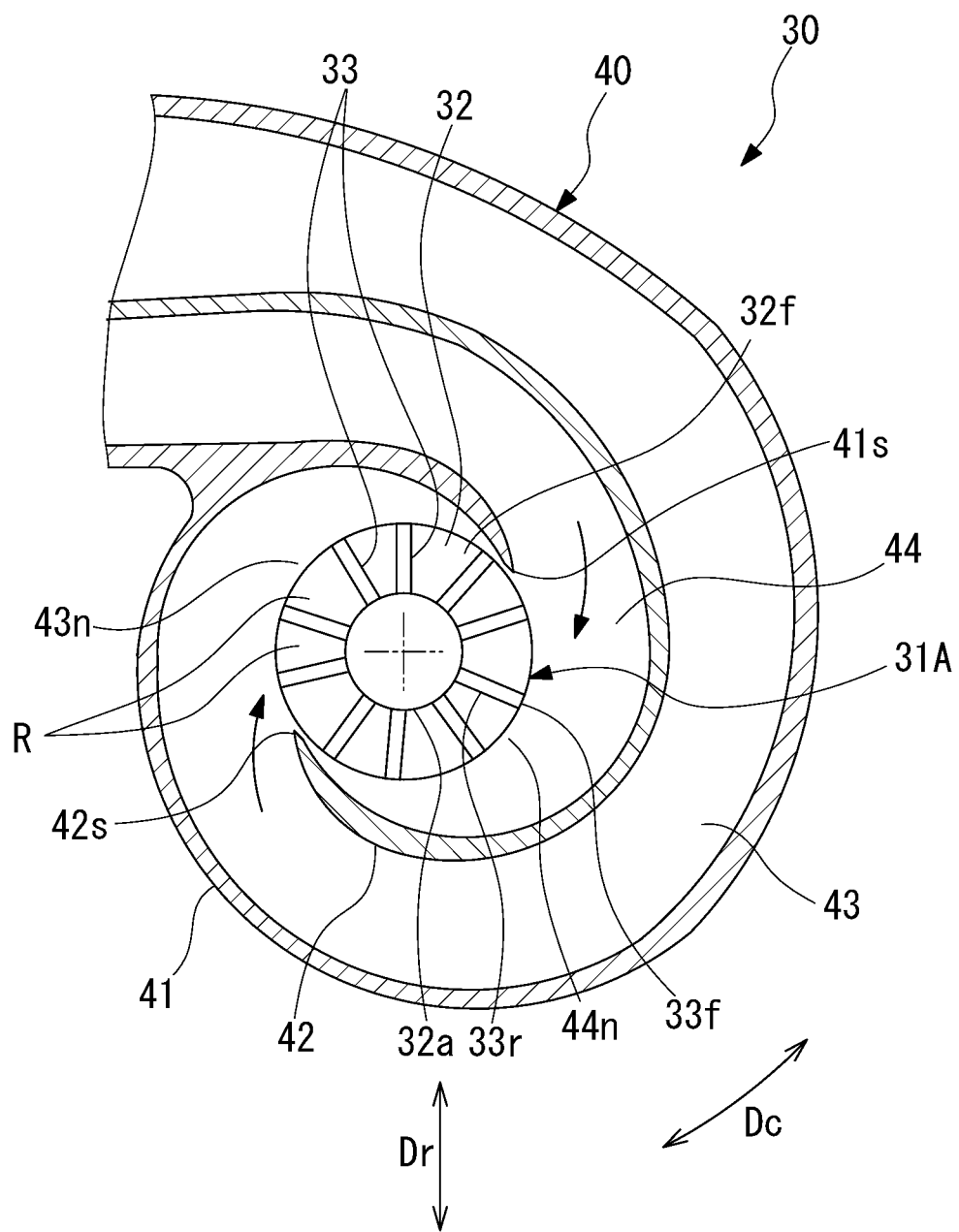
FIG. 2 is a view in which a turbine of a turbocharger of a first embodiment of the present disclosure is viewed from a center axis direction.

As shown in FIG. 2, the turbine housing 40 includes a gas introduction portion (not shown) and scroll flow paths 43 and 44. The gas introduction portion (not shown) opens to the outside and introduces an exhaust gas discharged from the engine (not shown) into the turbine housing 40.

The scroll flow paths 43 and 44 are formed inside the turbine housing 40. The scroll flow paths 43 and 44 guides the exhaust gas rotationally driving the impeller 31A to gradually move inward in the radial direction Dr while turning in the circumferential direction Dc.

The turbine housing 40 includes a tubular peripheral wall 41 and an intermediate wall 42 which is formed inside the peripheral wall 41. The peripheral wall 41 gradually extends inward in the radial direction Dr while being continuous from the gas introduction portion (not shown) to the circumferential direction Dc in a spiral shape as a whole. The intermediate wall 42 divides the inside of the tubular peripheral wall 41 into the outside of the radial direction Dr and the inside of the radial direction Dr centered on the center axis C. Accordingly, a scroll flow path 43 disposed on the outside of the radial direction Dr with respect to the intermediate wall 42 and a scroll flow path 44 disposed on the inside of the radial direction Dr with respect to the intermediate wall 42 are defined inside the peripheral wall 41 of the turbine housing 40.

The peripheral wall 41 and the intermediate wall 42 include tongue portions 41s and 42s at a position adjacent to the impeller 31A on the outside of the radial direction Dr. The tongue portion 41s of the peripheral wall 41 and the tongue portion 42s of the intermediate wall 42 are arranged at positions different from each other by approximately 180° in the circumferential direction Dc with the impeller 31A interposed therebetween. The scroll flow path 43 and the scroll flow path 44 include nozzle portions 43n and 44n which open toward the impeller 31A on the inside of the radial direction Dr. The nozzle portion 43n and the nozzle portion 44n face each other in the radial direction Dr with the impeller 31A interposed therebetween. The nozzle portion 43n of the scroll flow path 43 is open over approximately 180° in the circumferential direction Dc between the tongue portion 41s of the peripheral wall 41 and the tongue portion 42s of the intermediate wall 42. The nozzle portion 44n of the scroll flow path 44 is open over approximately 180° in the circumferential direction Dc between the tongue portion 42s of the intermediate wall 42 and the tongue portion 41s of the peripheral wall 41.

Further, as shown in FIG. 1, the turbine housing 40 is provided with an exhaust portion 45 which is formed on the inside of the radial direction Dr of the peripheral wall 41 to discharge an exhaust gas discharged from the impeller 31A toward the center axis C.

An exhaust gas is supplied from the engine (not shown) to the gas introduction portion (not shown) of such a turbine housing 40. The exhaust gas flowing from the gas introduction portion (not shown) gradually flows inward in the radial direction Dr while turning in the circumferential direction Dc on the outside of the radial direction Dr of the impeller 31A along the scroll flow paths 43 and 44. The exhaust gas is supplied from the nozzle portions 43n and 44n to the impeller 31A on the inside of the radial direction Dr. The impeller 31A rotates around the center axis C by being hit by the exhaust gas flow. The exhaust gas having passed through the impeller 31A is discharged from the inside of the radial direction Dr of the impeller 31A to the outside through the exhaust portion 45.

Due to the rotation of such an impeller 31A, the rotating shaft 13 and the compressor wheel 21 rotate around the center axis C integrally with the impeller 31A. The compressor wheel 21 rotates around the center axis C to compress air introduced from the outside into the compressor housing 22. The air compressed by the compressor 20 is supplied from the compressor housing 22 to the engine (not shown).

(Configuration of Impeller)

Figure 3:
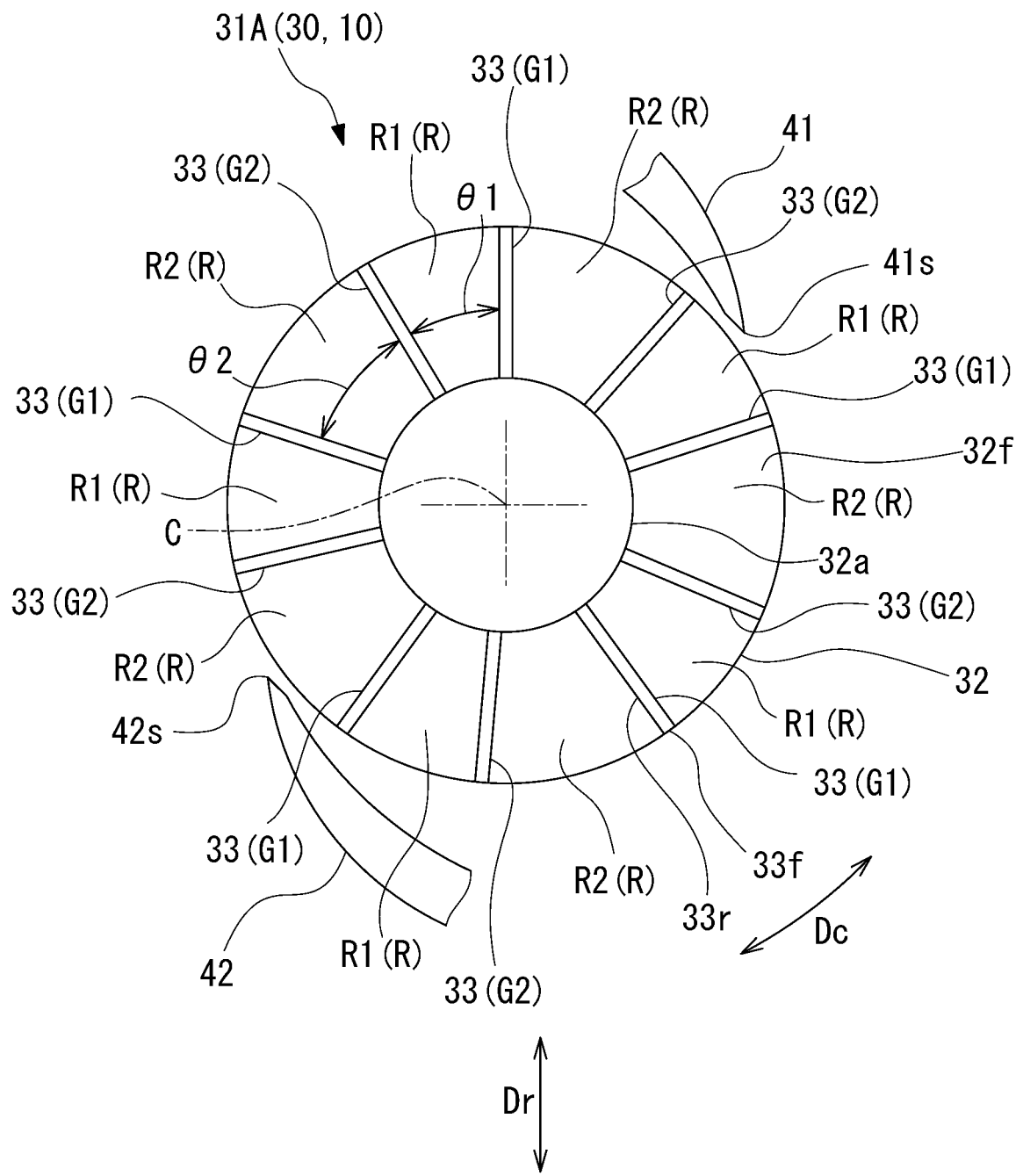
FIG. 3 is a view in which an impeller constituting the turbine of the first embodiment of the present disclosure is viewed from the center axis direction.

The impeller 31A is disposed at the other end side of the rotating shaft 13 in the direction of the center axis C on the outside of the bearing housing 12. The impeller 31A rotates around the center axis C integrally with the rotating shaft 13. As shown in FIGS. 1 to 3, the impeller 31A is integrally provided with a hub 32 and a turbine blade 33.

The hub 32 is fixed to the other end side of the rotating shaft 13 in the direction of the center axis C. The hub 32 is rotatable around the center axis C integrally with the rotating shaft 13. The hub 32 has a disk shape when viewed from the direction of the center axis C. The hub 32 has a constant thickness in the direction of the center axis C at a hub center portion 32a on the inside of the radial direction Dr. The hub 32 gradually decreases in thickness in the direction of the center axis C outward in the radial direction Dr from the hub center portion 32a. The hub 32 includes a disk surface 32f which faces the exhaust portion 45 in the direction of the center axis C. The disk surface 32f is formed by a concave curved surface which is gradually directed from the side closer to the exhaust portion 45 in the direction of the center axis C toward the bearing housing 12 on the side opposite to the exhaust portion 45 in the direction of the center axis C as it goes outward in the radial direction Dr.

A plurality of the turbine blades 33 are arranged on the disk surface 32f at intervals in the circumferential direction Dc around the center axis C. In the embodiment of the present disclosure, the impeller 31A includes, for example, ten turbine blades 33.

Each turbine blade 33 includes a leading edge 33f and a trailing edge 33r. The leading edge 33f faces the nozzle portions 43n and 44n of the scroll flow paths 43 and 44 to be directed outward in the radial direction Dr. The leading edge 33f is disposed to separate a predetermined gap in the radial direction Dr between the tongue portion 41s of the peripheral wall 41 and the tongue portion 42s of the intermediate wall 42 which are located on the outside of the radial direction Dr. The trailing edge 33r faces the exhaust portion 45 to be directed toward the other side in the direction of the center axis C.

As shown in FIG. 3, in such an impeller 31A, an inter-blade flow path portion R is formed between the turbine blades 33 which are adjacent to each other in the circumferential direction Dc. The exhaust gas which flows inward in the radial direction Dr from the scroll flow paths 43 and 44 on the outside of the impeller 31A in the radial direction Dr passes through the inter-blade flow path portion R between the turbine blades 33 which are adjacent to each other in the circumferential direction Dc. The exhaust gas which flows inward in the radial direction Dr from the leading edge 33f of the turbine blade 33 changes the flow direction due to the curvature of the disk surface 32f and is discharged along the center axis C from the trailing edge 33r of the turbine blade 33. The impeller 31A includes a plurality of the inter-blade flow path portions R in the circumferential direction Dc.

In the impeller 31A, the flow path width in the circumferential direction Dc of at least one inter-blade flow path portion R1 of the plurality of inter-blade flow path portions R formed between the plurality of turbine blades 33 is different from the flow path width of the other inter-blade flow path portion R2. In the embodiment of the present disclosure, the impeller 31A includes an inter-blade flow path portion R1 and an inter-blade flow path portion R2 having different flow path widths from each other in the circumferential direction Dc.

For example, the flow path width may be a pinch angle on the side of the leading edge 33f of the turbine blade 33 formed between the adjacent turbine blades 33.

For example, the inter-blade flow path portion R1 may be formed between the turbine blades 33 which are adjacent to each other at a pinch angle θ1.

For example, the inter-blade flow path portion R2 may be formed between the turbine blades 33 which are adjacent to each other at a pinch angle θ2.

For example, in the embodiment of the present disclosure, the pinch angle θ1 may be smaller than the pinch angle θ2.

For example, the pinch angle θ1 may be set to, for example, 31°.

For example, the pinch angle θ2 may be set to, for example, 41°.

For example, the inter-blade flow path portion R1 and the inter-blade flow path portion R2 having different flow path widths from each other in the circumferential direction Dc may be alternately arranged in the circumferential direction Dc.

If the thickness of the turbine blade 33 in the circumferential direction Dc is not negligible with respect to the pinch angle, the pinch angle may be an angle formed by the facing surfaces of the adjacent turbine blades 33. At that time, for example, the pinch angle θ1 may be set to an angle obtained by subtracting an angle corresponding to the thickness of the turbine blade 33 in the circumferential direction Dc from 31° and the pinch angle θ2 may be set to an angle obtained by subtracting an angle corresponding to the thickness of the turbine blade 33 in the circumferential direction Dc from 41°.

However, hereinafter, a case including the case of FIG. 3 in which the thickness of the turbine blade 33 in the circumferential direction Dc is negligible with respect to the pinch angle will be described.

In this way, the impeller 31A includes a plurality of turbine blades 33 arranged at uneven intervals in the circumferential direction Dc. The impeller 31A has a total of five sets of two types of inter-blade flow path portions R1 and R2 having different flow path widths (pinch angles) from each other in the circumferential direction Dc.

Here, two types of inter-blade flow path portions R1 and R2 having different flow path widths (pinch angles) from each other in the circumferential direction Dc include a turbine blade group G1 (a first group of turbine blades) and a turbine blade group G2 (a second group of turbine blades) including five turbine blades 33. Each of the turbine blade groups G1 and G2 includes five turbine blades 33 arranged at equal intervals of 72° in the circumferential direction Dc.

Each turbine blade 33 of the turbine blade group G2 is disposed with a clockwise phase shift in the circumferential direction Dc with respect to each turbine blade 33 of the turbine blade group G1.

Therefore, it is possible to easily configure the plurality of turbine blades 33 arranged at unequal intervals in the circumferential direction Dc as a whole by unitizing five members of each of the turbine blade groups G1 and G2 and forming them with a phase shift.

Thus, it is possible to easily manufacture the turbocharger 10.

Figure 4:
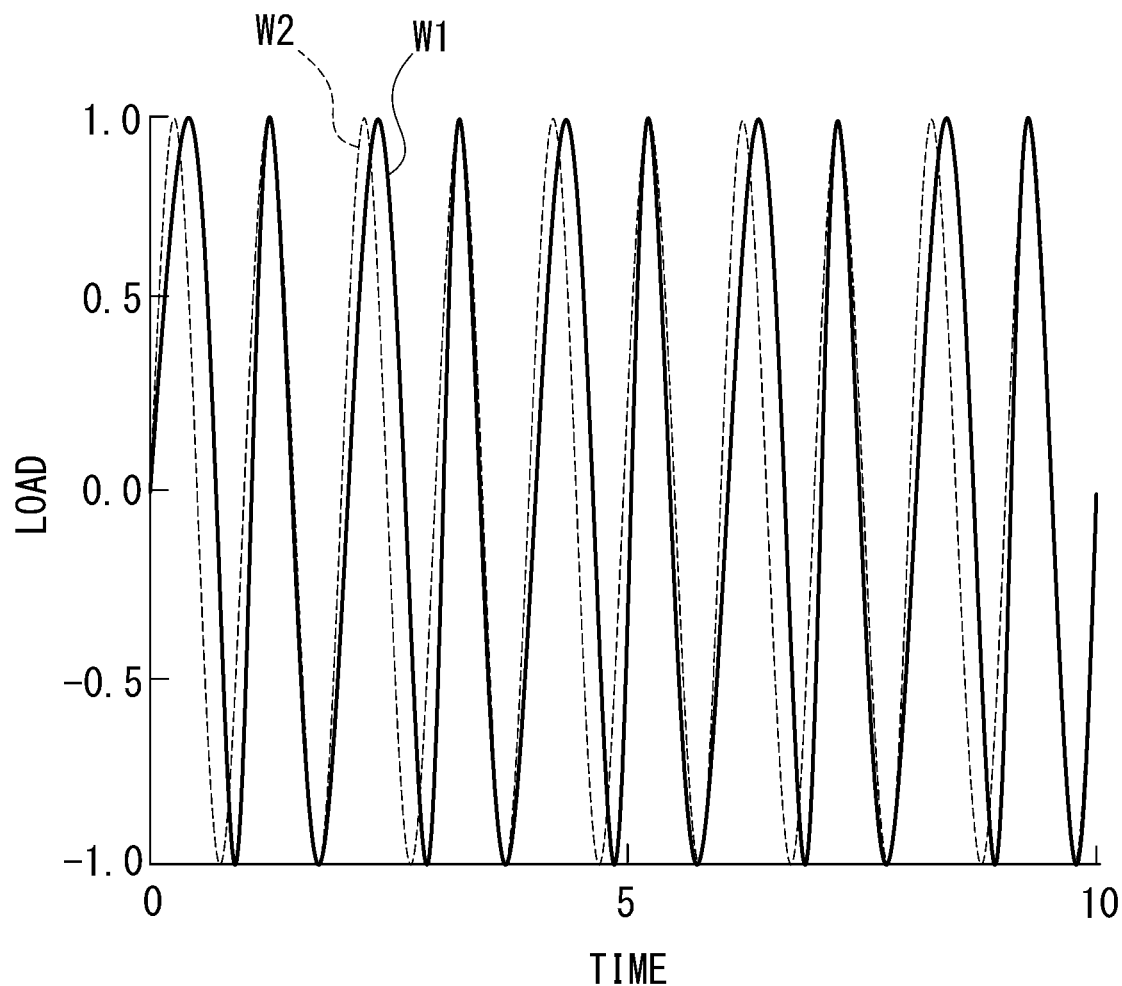
FIG. 4 is a view showing a load fluctuation simulation result of the impeller of the first embodiment of the present disclosure.

When a simulation is performed on load (pressure) fluctuations applied to the tongue portions 41s and 42s by using such an impeller 31A, the impeller 31A rotates around the center axis C and the tongue portions 41s and 42s and the plurality of turbine blades 33 approach each other, so that load fluctuations with an unequal pitch occur like a pressure fluctuation waveform W1 shown in FIG. 4. On the other hand, a similar simulation was performed for a case in which the plurality of turbine blades were arranged at equal intervals in the circumferential direction Dc for comparison and a pressure fluctuation waveform W2 had load fluctuations with an equal pitch.

Figure 5:
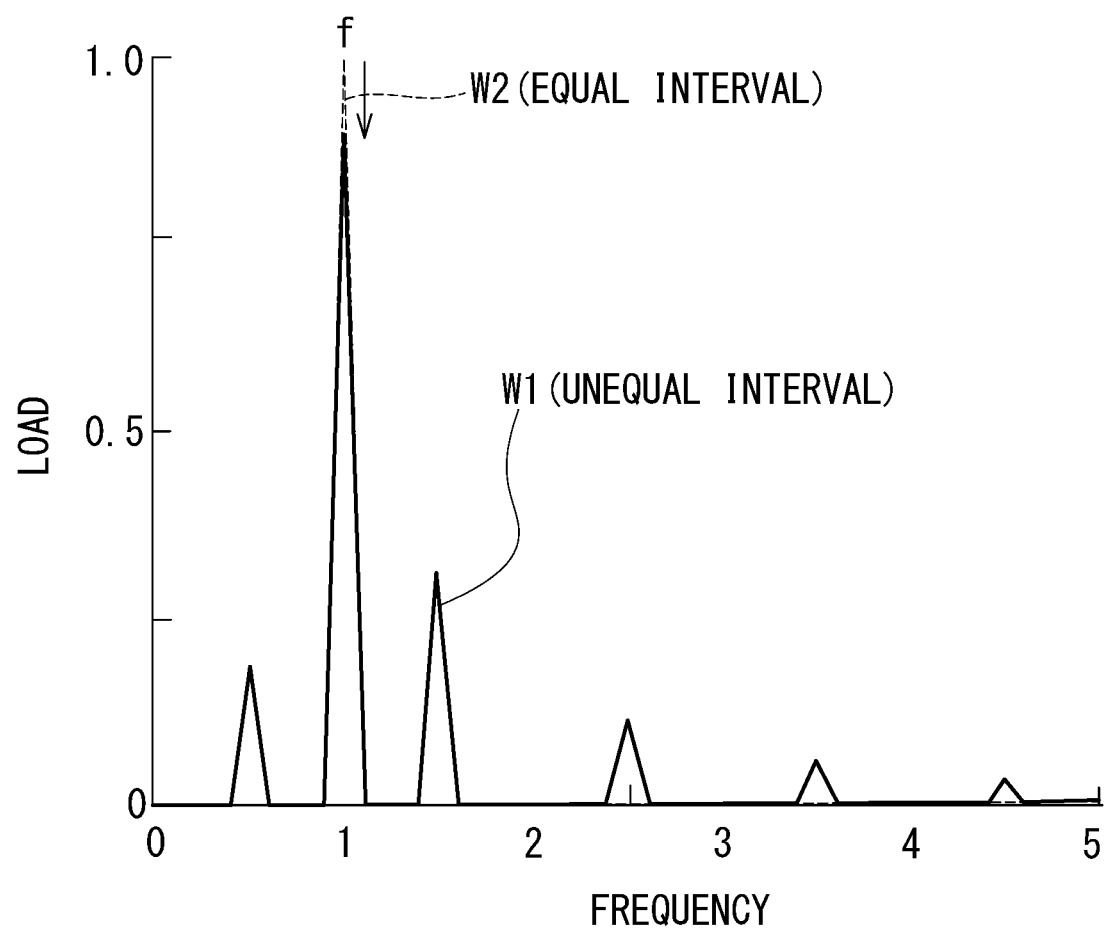
FIG. 5 is a view showing a noise frequency distribution based on the simulation result of FIG. 4.

Further, if frequency analysis is performed on the pressure fluctuation waveforms W1 and W2, load fluctuations are concentrated in a specific frequency range f when the plurality of turbine blades are arranged at equal intervals in the circumferential direction Dc as shown in FIG. 5. In contrast, when the plurality of turbine blades 33 were arranged at unequal intervals and the flow path width of the inter-blade flow path portion R1 was different from the flow path width of the inter-blade flow path portion R2 in the circumferential direction Dc, load fluctuations were dispersed over multiple frequency ranges.

According to the turbocharger 10 of the above-described embodiment, the flow path width in the circumferential direction Dc of a part of the inter-blade flow path portions R1 of the plurality of inter-blade flow path portions R is different from the flow path width of other inter-blade flow path portion R2. Accordingly, the pressure fluctuations occurring in the gaps between the plurality of turbine blades 33 and the tongue portions 41s and 42s become unequal pitches. Therefore, it is possible to disperse the frequency of noise generated in the gaps without widening the gaps between the plurality of turbine blades 33 and the tongue portions 41s and 42s. Accordingly, it is possible to reduce noise at the specific frequency. Thus, it is possible to suppress noise.

Further, in the above-described turbocharger 10, each turbine blade 33 of the second group of turbine blades G2 is disposed with a phase shift in the circumferential direction Dc with respect to each turbine blade 33 of the first group of turbine blades G1.

Accordingly, it is possible to easily configure the plurality of turbine blades 33 arranged at unequal intervals in the circumferential direction Dc as a whole by unitizing each of the first group of turbine blades G1 and the second group of turbine blades G2 and arranging them with a phase shift.

Thus, it is possible to easily manufacture the turbocharger 10.

In particular, if the number of the turbine blades 33 in the impeller 31A is an even number as in the above-described turbocharger 10, the impeller 31A can be configured such that the number of the turbine blades 33 of the first group of turbine blades G1 and the number of the turbine blades 33 of the second group of turbine blades G2 are the same.

Therefore, it is easy to balance the center of the impeller 31A when the first group of turbine blades G1 and the second group of turbine blades G2 are combined.

Modified Example of First Embodiment

Additionally, in the above-described embodiment, the pinch angle θ1 of the inter-blade flow path portion R1 was set to 31° and the pinch angle θ2 of the inter-blade flow path portion R2 was set to 41°. However, the present disclosure is not limited thereto. The pinch angle θ1 of the inter-blade flow path portion R1 and the pinch angle θ2 of the inter-blade flow path portion R2 can be appropriately changed.

Figure 6:
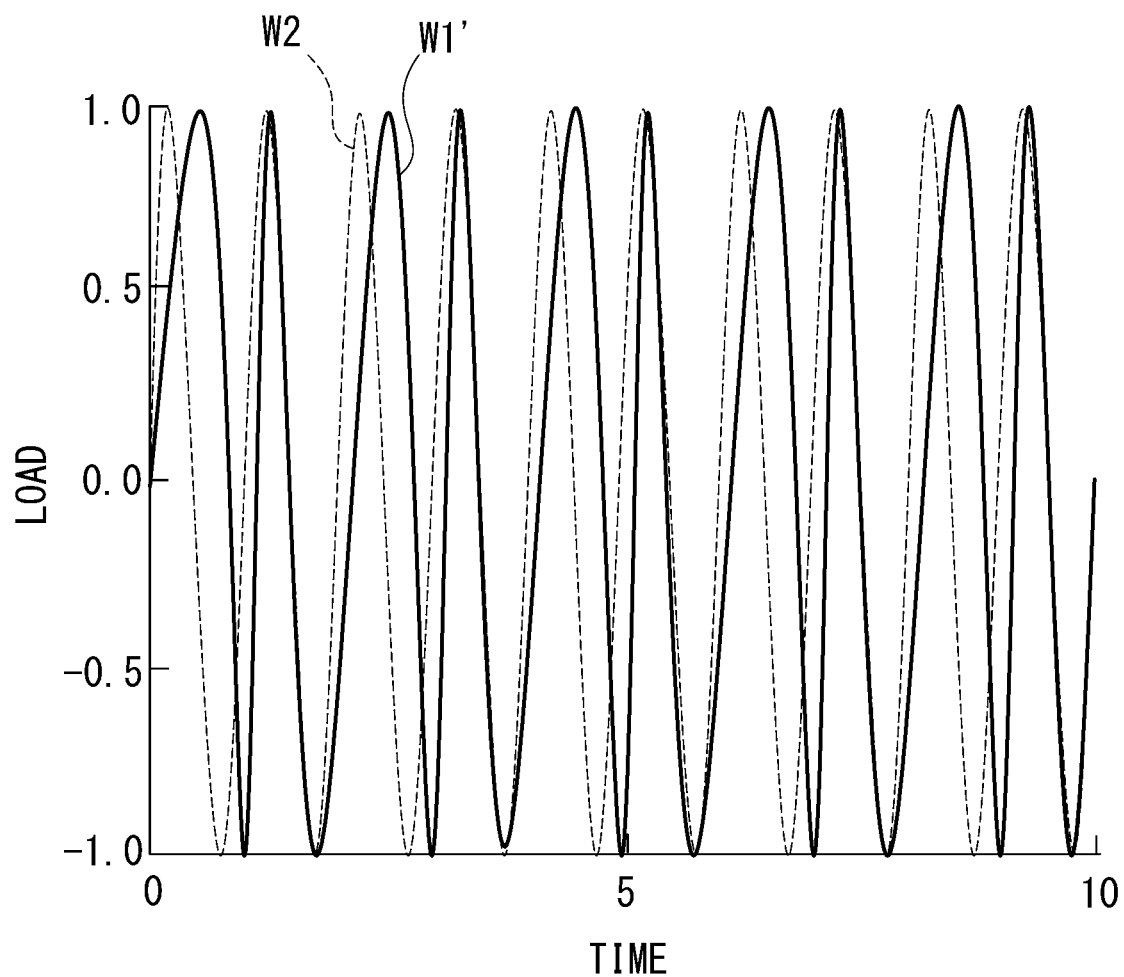
FIG. 6 is a view showing a load fluctuation simulation result of an impeller of a modified example of the first embodiment of the present disclosure.
Figure 7:
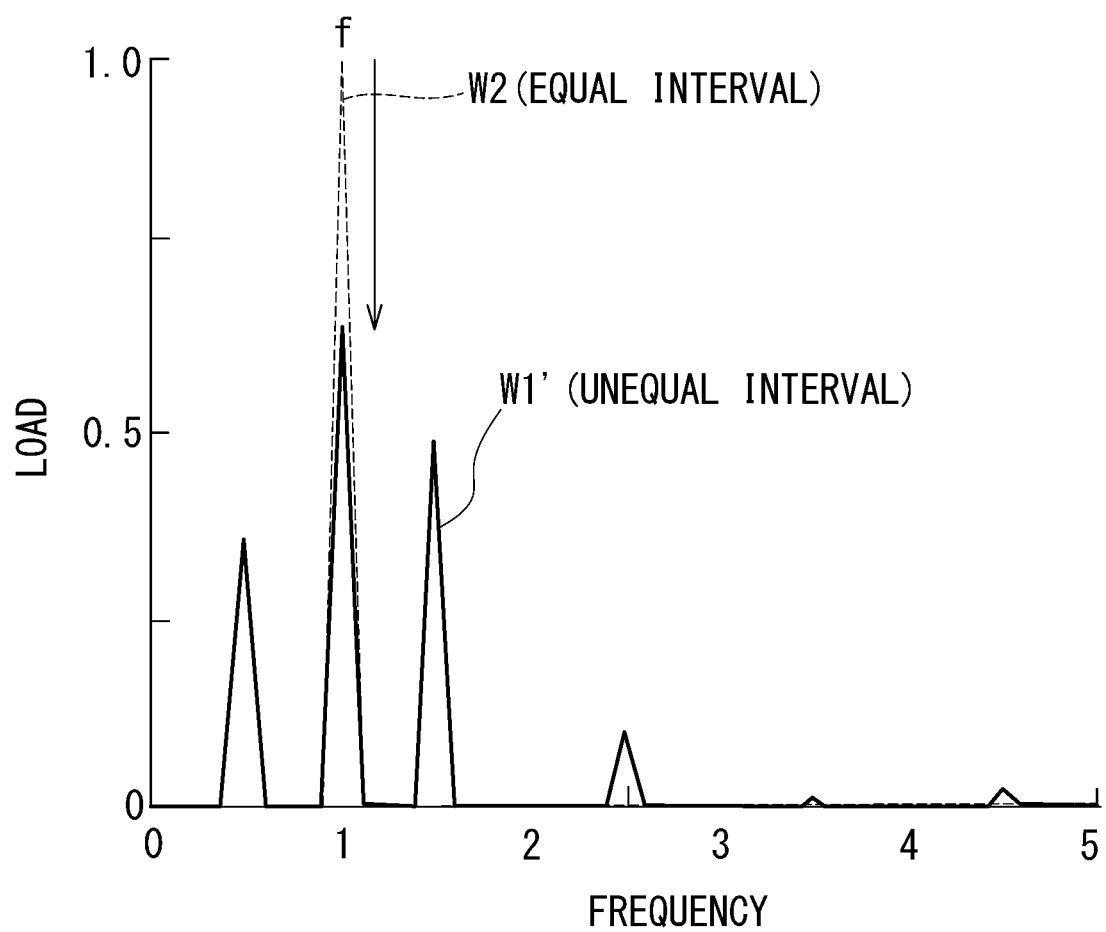
FIG. 7 is a view showing a noise frequency distribution based on the simulation result of FIG. 6.

For example, the pinch angle θ1 of the inter-blade flow path portion R1 may be set to 26° and the pinch angle θ2 of the inter-blade flow path portion R2 may be set to 46°. In this case, as shown in FIG. 6, load fluctuations with an unequal pitch occur like a pressure fluctuation waveform W1' also in the impeller 31A in which the pinch angles θ1 and θ2 are different from each other. The pressure fluctuation waveform W1' has a larger deviation than the pressure fluctuation waveform W2 when the turbine blades 33 are installed at equal intervals. As shown in FIG. 7, if frequency analysis is performed on the pressure fluctuation waveform W1' of FIG. 6, the load fluctuations are more dispersed in other frequency ranges and the load (noise) peak in the specific frequency range f was greatly reduced by arranging the plurality of turbine blades 33 at unequal intervals and setting the flow path width of the inter-blade flow path portion R1 in the circumferential direction Dc to be different from the flow path width of the inter-blade flow path portion R2.

Second Embodiment

Next, a turbocharger of a second embodiment of the present disclosure will be described.

In the second embodiment, the same reference numerals are given to the same components as those of the first embodiment and detailed descriptions thereof are omitted. The turbocharger of the second embodiment is different from that of the first embodiment in the arrangement of the plurality of turbine blades 33.

Figure 8:
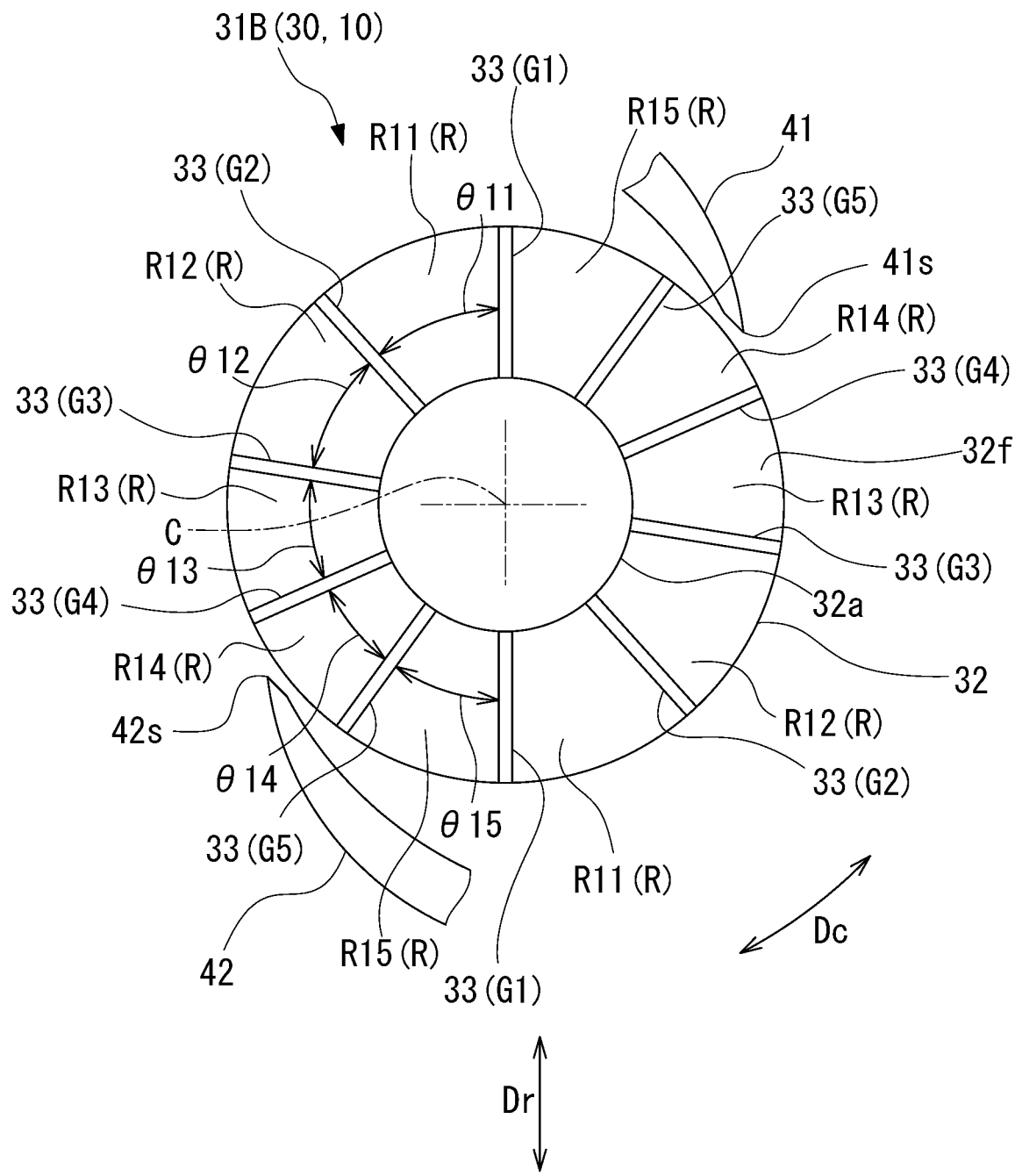
FIG. 8 is a view in which an impeller constituting a turbine of a second embodiment of the present disclosure is viewed from a center axis direction.

As shown in FIG. 8, an impeller 31B constituting the turbine 30 of the turbocharger 10 of the second embodiment includes, for example, ten turbine blades 33 which are arranged at intervals in the circumferential direction Dc similarly to the above-described first embodiment.

In the impeller 31B of the embodiment of the present disclosure, the plurality of inter-blade flow path portions R formed between the plurality of turbine blades 33 include five types of inter-blade flow path portions R11 to R15 having different flow path widths from each other in the circumferential direction Dc. In five types of inter-blade flow path portions R11 to R15, the pinch angles θ11 to θ15 of the adjacent turbine blades 33 are different from each other. The inter-blade flow path portion R11 is formed between the turbine blades 33 which are adjacent to each other at the pinch angle θ11. In the embodiment of the present disclosure, the pinch angle θ11 is set to, for example, 42°. The inter-blade flow path portion R12 is formed between the turbine blades 33 which are adjacent to each other at the pinch angle θ12. The pinch angle θ12 is set to, for example, 39°. The inter-blade flow path portion R13 is formed between the turbine blades 33 which are adjacent to each other at the pinch angle θ13. The pinch angle θ13 is set to, for example, 33°. The inter-blade flow path portion R14 is formed between the turbine blades 33 which are adjacent to each other at the pinch angle θ14. The pinch angle θ14 is set to, for example, 30°. The inter-blade flow path portion R15 is formed between the turbine blades 33 which are adjacent to each other at the pinch angle θ15. The pinch angle θ15 is set to, for example, 36°.

In this way, the impeller 31B includes the plurality of turbine blades 33 which are arranged at unequal intervals in the circumferential direction Dc. In the impeller 31B, a total of two sets of inter-blade flow path portions R11 to R15 including five types of pinch angles θ11 to θ15 are arranged in the circumferential direction Dc.

Here, five types of inter-blade flow path portions R11 to R15 in which the flow path widths (pinch angles) in the circumferential direction Dc are different from each other include turbine blade groups G1 to G5 (a first group of turbine blades to a fifth group of turbine blades) each including two turbine blades 33. Each of the turbine blade groups G1 to G5 includes two turbine blades 33 which are arranged at equal intervals of 180° in the circumferential direction Dc. Each turbine blade 33 of the turbine blade groups G1 to G5 is disposed with a phase shift in the circumferential direction Dc.

Therefore, it is possible to easily configure the plurality of turbine blades 33 arranged at unequal intervals in the circumferential direction Dc as a whole by unitizing two members of each of the turbine blade groups G1 to G5 and arranging them with a phase shift.

Thus, it is possible to easily manufacture the turbocharger 10.

Figure 9:
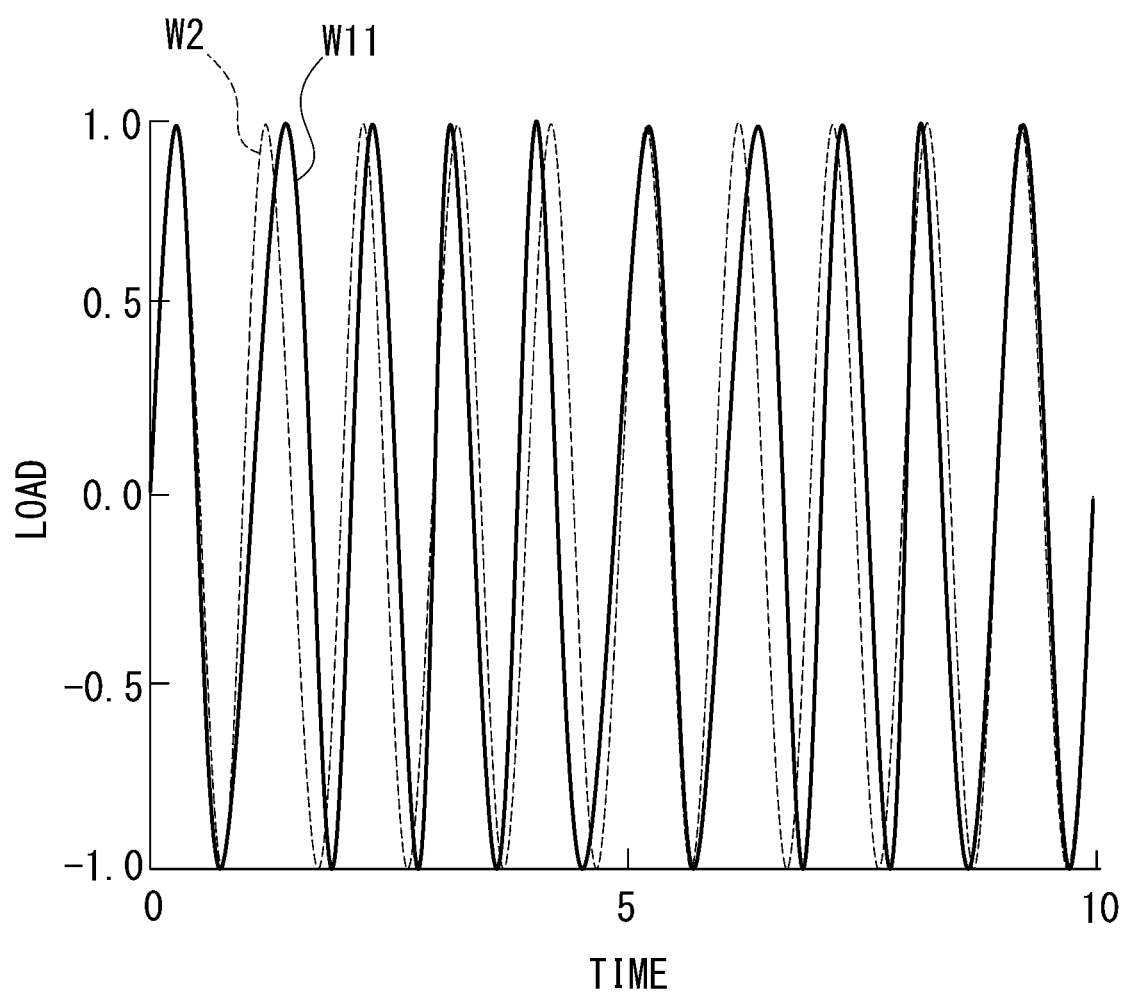
FIG. 9 is a view showing a load fluctuation simulation result of the impeller of the second embodiment of the present disclosure.
Figure 10:
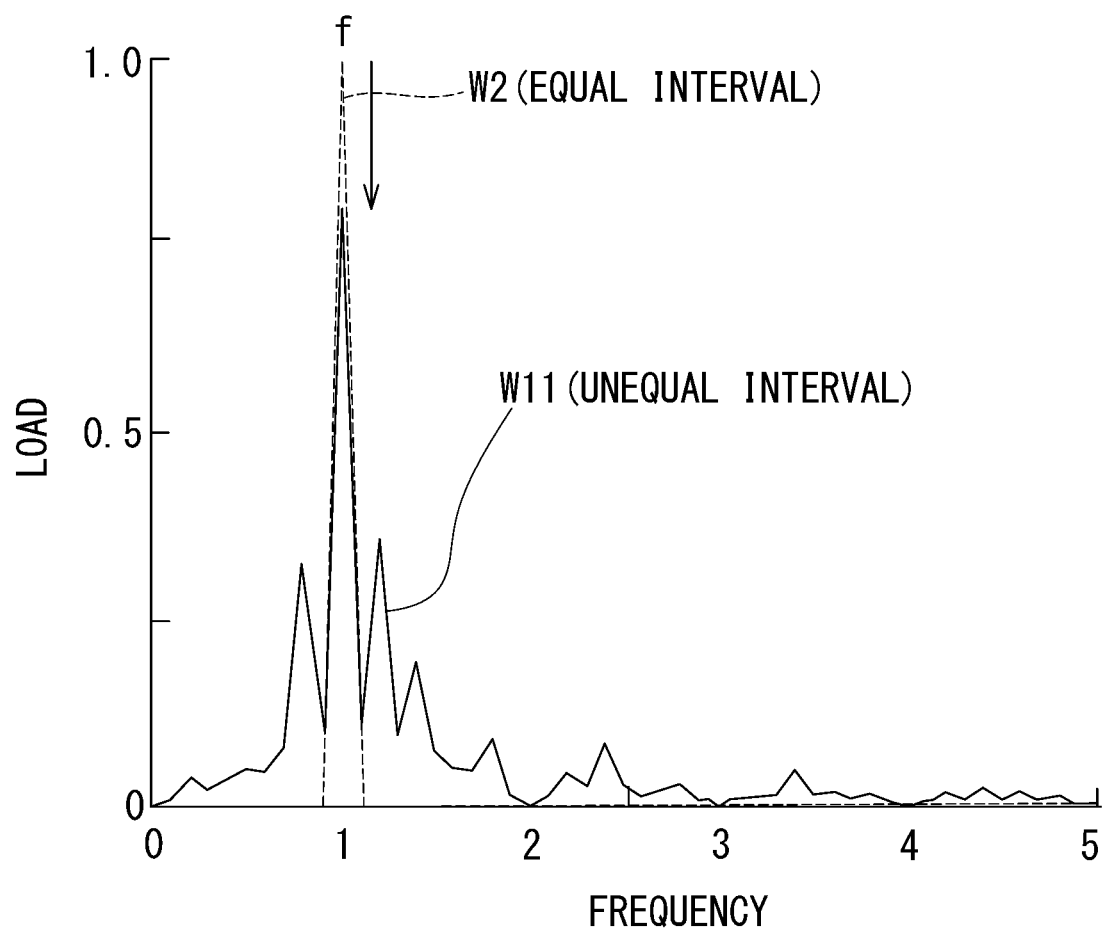
FIG. 10 is a view showing a noise frequency distribution based on the simulation result of FIG. 9.

When a simulation is performed on load (pressure) fluctuations applied to the tongue portions 41s and 42s by using such an impeller 31B, the impeller 31B rotates around the center axis C and the plurality of turbine blades 33 and the tongue portions 41s and 42s approach each other, so that load fluctuations with an unequal pitch occur like the pressure fluctuation waveform W11 shown in FIG. 9. Further, if frequency analysis is performed on the pressure fluctuation waveform W11, load fluctuations are more dispersed in other frequency ranges compared to the pressure fluctuation waveform W1 of the first embodiment shown in FIGS. 5 and 7 when the plurality of turbine blades 33 are arranged at unequal intervals and the flow path widths of the inter-blade flow path portions R11 to R15 in the circumferential direction Dc are different from each other as shown in FIG. 10.

According to the turbocharger 10 of the above-described embodiment, the flow path widths of the plurality of inter-blade flow path portions R11 to R15 are different from each other. Accordingly, it is possible to disperse the frequency of noise generated in the gaps without widening the gaps between the plurality of turbine blades 33 and the tongue portions 41s and 42s. Accordingly, it is possible to reduce noise in the specific frequency range f. Thus, it is possible to suppress noise.

Third Embodiment

Next, a turbocharger of a third embodiment of the present disclosure will be described.

In the third embodiment, the same reference numerals are given to the same components as those of the first and second embodiments and detailed descriptions thereof are omitted. The turbocharger of the third embodiment is different from that of the first embodiment in the structure of the hub 32.

Figure 11:
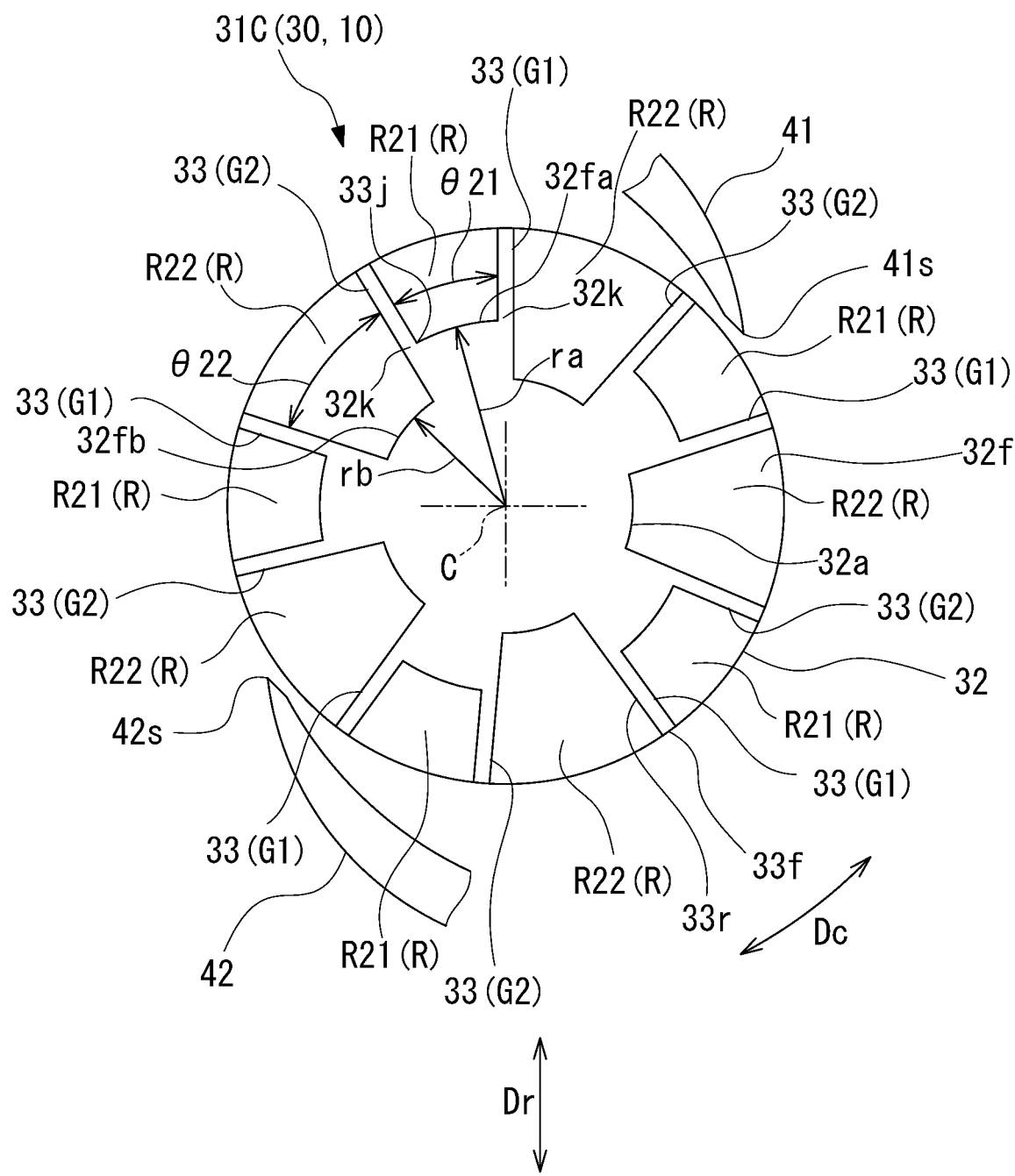
FIG. 11 is a view in which an impeller constituting a turbine of a third embodiment of the present disclosure is viewed from a center axis direction.

As shown in FIG. 11, an impeller 31C constituting the turbine 30 of the turbocharger 10 of the third embodiment includes, for example, ten turbine blades 33 which are arranged at intervals in the circumferential direction Dc similarly to the above-described first embodiment.

Similarly to the above-described first embodiment, the impeller 31C of the embodiment of the present disclosure includes a first inter-blade flow path portion R21 and a second inter-blade flow path portion R22 which have different flow path widths from each other in the circumferential direction Dc. The first inter-blade flow path portion R21 is formed between the turbine blades 33 which are adjacent to each other at a pinch angle θ21 (for example, 31°). The second inter-blade flow path portion R22 is formed between the turbine blades 33 which are adjacent to each other at a pinch angle θ22 (for example, 41°). The impeller 31C has a total of five sets of two types of the first inter-blade flow path portions R21 and the second inter-blade flow path portions R22 having different flow path widths (pinch angles) from each other in the circumferential direction Dc.

In such an impeller 31C, two types of the first inter-blade flow path portion R21 and the second inter-blade flow path portion R22 having different flow path widths (pinch angles) from each other in the circumferential direction Dc have different radial dimensions of the hub 32 from each other. The radial dimension ra of the hub 32 of the first inter-blade flow path portion R21 is larger than the radial dimension rb of the hub 32 of the second inter-blade flow path portion R22 having a larger flow path width than that of the first inter-blade flow path portion R21. Accordingly, since the radial dimension ra of the hub 32 is large in the first inter-blade flow path portion R21 having a narrow flow path width, a disk surface 32fa of the hub 32 is located on the outside of the radial direction Dr in relation to a disk surface 32fb of the hub 32 in the second inter-blade flow path portion R22. Accordingly, a gap in the circumferential direction Dc between roots 33k of the turbine blades 33 which are adjacent to each other in the first inter-blade flow path portion R21 is substantially widened.

According to the turbocharger 10 of the above-described embodiment, the radial dimension ra of the hub 32 is large in the first inter-blade flow path portion R21 having a narrow flow path width and the radial dimension rb of the hub 32 is small in the second inter-blade flow path portion R22 having a wide flow path width. Accordingly, also in the first inter-blade flow path portion R21 having a narrow flow path width, it becomes possible to easily carry out processing or the like the curved surface of the portion 33j connecting the root 33k of the turbine blade 33 and the disk surface 32fa of the hub 32. Further, it becomes possible to increase the radius of curvature of the portion 33j connecting the root 33k of the turbine blade 33 and the disk surface 32fa of the hub 32 and hence the concentration of stress on the root 33k of the turbine blade 33 is suppressed.

Further, similarly to the above-described embodiments, the flow path widths of the first inter-blade flow path portion R21 and the second inter-blade flow path portion R22 were set to be different from each other. Accordingly, it is possible to reduce noise at the specific frequency. Thus, it is possible to suppress noise.

Fourth Embodiment

Next, a turbocharger of a fourth embodiment of the present disclosure will be described.

In the fourth embodiment, the same reference numerals are given to the same components as those of the first to third embodiments and detailed descriptions thereof are omitted.

The turbocharger of the fourth embodiment is different from those of the first to third embodiments in the arrangement of a plurality of turbine blades 33G on the side of the trailing edge 33r on the downstream side of the exhaust gas flow direction.

Figure 12:
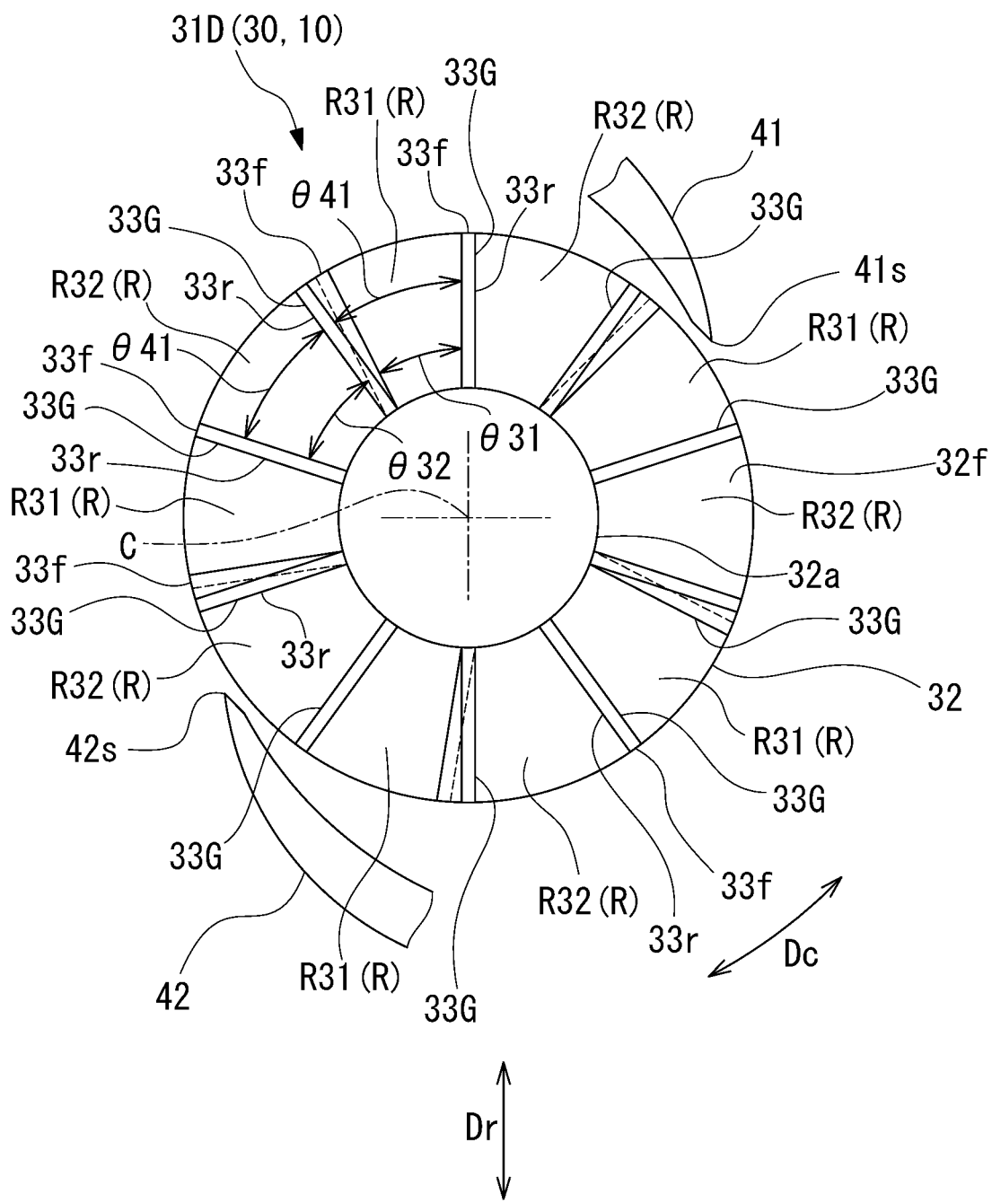
FIG. 12 is a view in which an impeller constituting a turbine of a fourth embodiment of the present disclosure is viewed from a center axis direction.

As shown in FIG. 12, an impeller 31D constituting the turbine 30 of the turbocharger 10 of the fourth embodiment includes, for example, ten turbine blades 33G which have arranged at intervals in the circumferential direction Dc similarly to the above-described first embodiment.

The plurality of turbine blades 33G of the embodiment of the present disclosure are arranged so that the trailing edge 33r on the downstream side of the exhaust gas flow direction has the same minimum flow path area between the blades which are adjacent to each other in the circumferential direction Dc.

On the other hand, in the plurality of turbine blades 33G, the leading edges 33f on the upstream side of the exhaust gas flow direction are arranged at unequal intervals in the circumferential direction Dc.

Similarly to the above-described first embodiment, the impeller 31D of the embodiment of the present disclosure includes a first inter-blade flow path portion R31 and a second inter-blade flow path portion R32 which have different flow path widths from each other in the circumferential direction Dc. The first inter-blade flow path portion R31 is formed between the turbine blades 33G which are adjacent to each other at a pinch angle θ31 (for example, 31°) on the side of the leading edge 33f. The second inter-blade flow path portion R32 is formed between the turbine blades 33G which are adjacent to each other at a pinch angle θ32 (for example, 41°) on the side of the leading edge 33f.

On the other hand, the first inter-blade flow path portion R31 and the second inter-blade flow path portion R32 are arranged to have the same minimum flow path area between the adjacent blades by respectively having the same pinch angle θ41 on the side of the trailing edge 33r.

In the turbocharger 10 of the above-described embodiment, the flow path widths of the first inter-blade flow path portion R31 and the second inter-blade flow path portion R32 on the side of the leading edge 33f on the upstream side of the exhaust gas flow direction were made different from each other. Accordingly, it is possible to suppress noise.

On the other hand, since the plurality of turbine blades 33G are arranged to have the same minimum flow path area between the blades adjacent to each other in the circumferential direction Dc on the downstream side of the exhaust gas flow direction, the load applied to the plurality of turbine blades 33G on the downstream side of the exhaust gas flow direction can be made uniform.

Additionally, in this embodiment, since the plurality of turbine blades 33G having the same thickness in the circumferential direction Dc of each turbine blade 33 on the downstream side of the exhaust gas flow direction are arranged at equal intervals in the circumferential direction Dc, the plurality of turbine blades are arranged to have the same minimum flow path area between the blades which are adjacent to each other in the circumferential direction Dc. However, any configuration may be adopted if the plurality of turbine blades are arranged to have the same minimum flow path area.

As a modified example, even when the plurality of turbine blades 33G are arranged at unequal intervals in the circumferential direction Dc on the downstream side of the exhaust gas flow direction, the plurality of turbine blades 33G may be arranged to have the same minimum flow path area between the blades which are adjacent to each other in the circumferential direction Dc by setting the thickness of each turbine blade 33 in the circumferential direction Dc to be different.

OTHER EMBODIMENTS

Although the embodiments of the present disclosure have been described in detail above with reference to the drawings, each configuration and combination thereof in each embodiment is an example, and addition, omission, replacement, and other modifications of the configuration can be made without departing from the scope of the present disclosure. Further, the present disclosure is not limited by the embodiments, but only by the claims.

For example, in the above-described embodiments, the flow path widths of the inter-blade flow path portions R were made different by setting the pinch angle between the turbine blades 33 adjacent to each other in the circumferential direction Dc to be different, but the flow path width of the inter-blade flow path portion R may be made different by setting the thickness of each turbine blade 33 in the circumferential direction Dc to be different as a modified example.

Further, in the above-described embodiments, ten turbine blades 33 are provided, but the number of the turbine blades 33 is not limited at all and may be set to another number as appropriate. As a modified example, the number of the turbine blades 33 may be an odd number.

Further, in the above-described embodiments, the turbine housing 40 includes two scroll flow paths 43 and 44, but the present disclosure is not limited thereto.

As a modified example, the turbine housing 40 may include only one scroll flow path.

As another modified example, the turbine housing 40 may have a configuration in which two scroll flow paths are arranged side by side in the direction of the center axis C.

<Appendix>

For example, the turbocharger 10 of each embodiment is understood as follows.

(1) The turbocharger 10 according to a first aspect includes: the impeller 31A to 31D which include a hub 32 provided to be rotatable around a center axis C and a plurality of turbine blades 33 and 33G arranged on the outside of the hub 32 in a radial direction Dr at intervals in a circumferential direction Dc around the center axis C; and a turbine housing 40 which is disposed on the outside of the impeller 31A to 31D in the radial direction Dr and forms a scroll flow path 43 and 44 guiding an exhaust gas toward the impeller 31A to 31D on the inside of the radial direction Dr while turning the exhaust gas in the circumferential direction Dc, wherein a flow path width in the circumferential direction Dc of at least one R1, R11, R21, and R31 of a plurality of inter-blade flow path portions R formed between the plurality of turbine blades 33 and 33G is different from a flow path width of another R2, R12, R22, and R32 of the plurality of inter-blade flow path portions.

In this turbocharger 10, the plurality of turbine blades 33 and 33G are arranged at unequal intervals. Accordingly, it is possible to disperse the frequency of noise generated in the gaps without widening the gaps between the plurality of turbine blades 33 and 33G and the tongue portions 41s and 42s arranged on the outside of the radial direction Dr of the turbine blades 33 and 33G in the turbine housing 40. Accordingly, it is possible to reduce noise at the specific frequency. Thus, it is possible to suppress noise.

(2) The turbocharger 10 according to a second aspect is the turbocharger 10 of (1), wherein the plurality of turbine blades 33 and 33G include a first group of turbine blades G1 which are arranged at equal intervals in the circumferential direction Dc and a second group of turbine blades G2 which are arranged at equal intervals in the circumferential direction, and wherein each turbine blade 33 and 33G of the second group of turbine blades G2 is disposed with a phase shift in the circumferential direction Dc with respect to each turbine blade 33 and 33G of the first group of turbine blades G1.

Accordingly, it is possible to easily configure the plurality of turbine blades 33 and 33G arranged at unequal intervals in the circumferential direction Dc as a whole by unitizing each of the first group of turbine blades G1 and the second group of turbine blades G2 and arranging them with a phase shift.

Thus, it is possible to easily manufacture the turbocharger 10.

(3) The turbocharger 10 according to a third aspect is the turbocharger 10 of (1) or (2), wherein a radial dimension ra of the hub 32 of a first of the plurality of inter-blade flow path portions R21 is larger than a radial dimension rb of the hub 32 of a second of the plurality of inter-blade flow path portions R22 having a larger flow path width than that of the first of the plurality of inter-blade flow path portions R21.

Accordingly, the radial dimension ra of the hub 32 is large in the first of the plurality of inter-blade flow path portions R21 having a narrow flow path width and the radial dimension rb of the hub 32 becomes smaller in the second of the plurality of inter-blade flow path portions R22 having a wide flow path width. In the first of the plurality of inter-blade flow path portions R21 having a narrow flow path width, it becomes possible to easily process the curved surface of the portion 33j connecting the root 33k of the turbine blade 33 and the disk surface 32f of the hub 32. Further, it becomes possible to increase the radius of curvature of the portion 33j connecting the root 33k of the turbine blade 33 and the disk surface 32f of the hub 32 and hence the concentration of stress on the root 33k of the turbine blade 33 is suppressed.

(4) The turbocharger 10 of a fourth aspect is the turbocharger 10 of any one of (1) to (3), wherein the plurality of turbine blades 33G are arranged to have the same minimum flow path area between the blades adjacent to each other in the circumferential direction Dc on a downstream side of an exhaust gas flow direction and are arranged at unequal intervals in the circumferential direction Dc on an upstream side of the exhaust gas flow direction.

Accordingly, the plurality of turbine blades 33 are arranged at unequal intervals in the circumferential direction Dc on the upstream side of the exhaust gas flow direction. Accordingly, the flow path widths of the inter-blade flow path portions R1 and R2 in the circumferential direction Dc are different from each other only in the portion in which the plurality of turbine blades 33G are adjacent to the tongue portions 41s and 42s. Even with this configuration, it is possible to disperse the frequency of noise generated in the gaps without widening the gaps between the turbine blade 33 and the tongue portions 41s and 42s. Accordingly, it is possible to reduce noise at the specific frequency. On the other hand, since the plurality of turbine blades 33G are arranged at equal intervals in the circumferential direction Dc on the downstream side of the exhaust gas flow direction, the load applied to the plurality of turbine blades 33G on the downstream side of the exhaust gas flow direction can be made uniform.

(5) The turbocharger 10 according to a fifth aspect is the turbocharger 10 of any one of (1) to (4), wherein the turbine housing 40 includes a plurality of the scroll flow paths 43 and 44 each supplying the exhaust gas to the impeller 31A to 31D from a plurality of different positions of the impeller 31A to 31D in the circumferential direction Dc.

Accordingly, it is possible to suppress noise in the turbocharger 10 including an exhaust gas inlet to the impeller 31A to 31D at different positions in the circumferential direction Dc.

INDUSTRIAL APPLICABILITY

According to the above-described turbocharger, it is possible to suppress noise.

REFERENCE SIGNS LIST

Turbocharger
11 Turbocharger body
12 Bearing housing
13 Rotating shaft
14A, 14B Bearing
15 Compressor
21 Compressor wheel
22 Compressor housing
22r Flow path
30 Turbine
31A to 31D impeller
32 Hub
32a Hub center portion
32f, 32fa, 32fb Disk surface
33, 33G Turbine blade
33f Leading edge
33r Trailing edge
33j Portion
33k Root
40 Turbine housing
41 Peripheral wall
41s Tongue portion
42 Intermediate wall
42s Tongue portion
43, 44 Scroll flow path
43n, 44n Nozzle portion
45 Exhaust portion
C Center axis
Dc Circumferential direction
Dr Radial direction
G1 Turbine blade group (first group of turbine blades)
G2 Turbine blade group (second group of turbine blades)
G3 to G5 Turbine blade group (third group of turbine blades to fifth group of turbine blades)
R, R1, R2, R11 to R15 Inter-blade flow path portion
R21, R31 First inter-blade flow path portion
R22, R32 Second inter-blade flow path portion
W1, W1', W11, W2 Pressure fluctuation waveform
f Specific frequency range
ra Radial dimension
rb Radial dimension $\theta1$, $\theta2$, $\theta11$ to $\theta15$, $\theta21$, $\theta22$, $\theta31$, $\theta32$, $\theta41$ Pinch angle

What is claimed is:

1. A turbocharger comprising:
an impeller which includes a hub provided to be rotatable around a center axis and a plurality of turbine blades arranged on the outside of the hub in a radial direction at intervals in a circumferential direction around the center axis; and
a turbine housing which is disposed on the outside of the impeller in the radial direction and forms a scroll flow path guiding an exhaust gas toward the impeller on the inside of the radial direction while turning the exhaust gas in the circumferential direction,
wherein a flow path width in the circumferential direction of at least one of a plurality of inter-blade flow path portions formed between the plurality of turbine blades is different from a flow path width of another of the plurality of inter-blade flow path portions wherein a radial dimension of the hub of a first of the plurality of inter-blade flow path portions is larger than a radial dimension of the hub of a second of the plurality of inter-blade flow path portions having a larger flow path width than that of the first of the plurality of inter-blade flow path portions.

2. The turbocharger according to claim 1,
wherein the plurality of turbine blades include a first group of turbine blades which are arranged at equal intervals in the circumferential direction and a second group of turbine blades which are arranged at equal intervals in the circumferential direction, and
wherein each turbine blade of the second group of turbine blades is disposed with a phase shift in the circumferential direction with respect to each turbine blade of the first group of turbine blades.

3. The turbocharger according to claim 1,
wherein the plurality of turbine blades are arranged to have the same minimum flow path area between the blades adjacent to each other in the circumferential direction on a downstream side of an exhaust gas flow direction and are arranged at unequal intervals in the circumferential direction on an upstream side of the exhaust gas flow direction.

4. The turbocharger according to claim 1,
wherein the turbine housing includes a plurality of the scroll flow paths each supplying the exhaust gas to the impeller from a plurality of different positions of the impeller in the circumferential direction.

* * * * *